Nov. 22, 1966    G. A. GODWIN    3,287,515
PROGRAM TIMING AND SWITCHING CONTROL MECHANISMS
Filed Oct. 15, 1963    4 Sheets-Sheet 1

INVENTOR
George A. Godwin
BY Justin V. Macklin
ATTORNEY

Nov. 22, 1966 G. A. GODWIN 3,287,515
PROGRAM TIMING AND SWITCHING CONTROL MECHANISMS
Filed Oct. 15, 1963 4 Sheets-Sheet 2

INVENTOR
George A. Godwin
BY Justin W. Macklin
ATTORNEY

INVENTOR
George A. Godwin
BY Justin W. Macklin
ATTORNEY

United States Patent Office 3,287,515
Patented Nov. 22, 1966

3,287,515
PROGRAM TIMING AND SWITCHING CONTROL MECHANISMS
George A. Godwin, Carmel, Ind., assignor, by mesne assignments, to Small Business Administration, Indianapolis, Ind.
Filed Oct. 15, 1963, Ser. No. 316,262
17 Claims. (Cl. 200—38)

The present invention relates to mechanisms for controlling the time sequence of operation of a variety of types of machines, such as domestic, automatic and semi-automatic, laundry and dish washing machines, injection molding machines, and the like, that perform a plurality of different types of operations during a complete cycle of the machine. The mechanisms of the invention are designed to be manually set at the beginning of the operation of such machines or to be manually actuated during their operation for varying the duration of one or more of the different operations performed by the machines.

For example, domestic, automatic, laundry washing machines carry out a sequence of operations which may include soaking, washing with soap or detergent, rinsing, spin-drying, rerinsing, spin-drying a second time, etc. The duration of one or more of these different operations is desirably varied according to differences in fabrics to be laundered and the character of dirt, stains, etc. to be removed from the fabrics. It is also desirable to provide for varying the temperature of the water pumped into the machine for the operations involving immersion of the fabrics in water, and this is often done by controlling the relative periods of time for which hot and cold water inlet valves are opened. In various other kinds of machines, such as injection molding machines, it is also desirable to provide for varying the duration of successive operations of the machine according to different predetermined programs for the introduction of molten metal or plastic, or the like, for permitting the molten material to solidify, etc., based upon the particular molten material employed and the size and configuration of the articles to be molded.

Such programming of the operation of machines is commonly controlled in a well known manner by the opening and closing of electrical switches which, in turn, are generally actuated mechanically by rotating cams. It has also been common practice to associate one or more switches with each of a plurality of cams and to mount all of the cams on one cam shaft that is rotatively driven at the same or different speeds by one or more electric motors. A wide variety of schemes have been employed, with varying degrees of flexibility in meeting machine operational requirements and reliably controlling operation of the machines over their useful life, while employing such cam-controlled-switch type mechanisms. Some of these schemes are admirably suited for certain uses, but are poorly suited or entirely inapplicable for other uses. All have certain limitations as regards the results obtainable therewith. Most of them are subject to manufacturing or assembly problems, or are noisy in operation, or require too frequent repairing, or are not sufficiently versatile for general use, or involve combinations of these and other deficiencies.

The present invention relates to program timers of the above described, cam-controlled-switch type which, according to the particular cam, switch, and electrical circuit details employed, may be preset for individually establishing for one or more machine operations, a desired duration of such operation or operations. The present invention particularly relates to such program timers designed to provide for selection of one of a series of predetermined programs of machine operation selected by the machine manufacturer to be best suited for the work to be performed, the relative lengths of the various long and short time periods being predetermined and fixed by the design of the cams, and the long or short duration of each machine operation being selected by presetting the several switches prior to starting the machine or in the course of its operation.

General objects of the invention are to provide efficient, reliable, durable, and trouble-free program timer mechanisms of the above described, cam-controlled-switch type that provide for rotating the cams at either of two predetermined speeds with the operatiing characteristics also described above.

Another object of the invention is to provide such program timers which are simple and economical to manufacture and assemble and which require a minimum of adjustment problems during or following assembly.

Another object of the invention is to provide a design for such program timers which is easily modified to expand the number of cams and switches and the functions performed thereby, as may be required to accommodate greater numbers of machine operations to be controlled with variable time settings and to adapt the timer mechanisms to the handling of multi-cycle machine operating programs.

Still another object of the invention is to provide such timers in a compact form that is readily adaptable to fit into small spaces of any of several configurations and proportions, as may be required by the available space in the machines of different manufacturers.

Another and related object of the invention is to provide such program timers that can be preset equally well by any of a number of manually operable, switch setting mechanisms, including remotely located switch setting mechanisms, as may be required by the machines of different manufacturers.

The foregoing objectives are achieved, in accordance with the present invention, in part by employing one single-speed electric motor for driving the timer mechanisms while utilizing a speed-change transmission drive between the motor and a cam shaft or cam shafts for rotating the cam shaft or cam shafts at a relatively high speed between desired machine operations and at a predetermined slower speed during the period of desired machine operations, rather than by advancing or retracting one or more cams, or by providing adjustable cams or intermittent drives or driving connections, or by employing more than one motor and associated driving mechanism. Another feature of the invention contributing to the accomplishment of the foregoing objectives involves the employment of additional switches in association with the cams for controlling the shifting of the speed-change transmission in accordance with a program that may be selected by a particular presetting of the additional switches. By utilizing only the first or both of these characteristic features of the invention, as the need may require, the objects of the invention involving the operation of the program timer may be achieved to a degree generally unattainable from prior program timer mechanisms.

Other features of the invention involves the construction and arrangement of the parts of the cam assemblies, the coacting switches, and a novel housing therefore that combine to achive the various other objects of the invention as will hereinafter more clearly appear.

The present invention has a number of special advantages. For example, the various objects of the invention may all be accomplished while using only a single, constant speed, electric motor, whereas comparable prior devices have commonly required the use of a plurality of motors. The present invention also lends itself to the use of relatively low power, shaded pole motors, suitably having a speed of operation in the neighborhood of 3,000 r.p.m., although the invention is not limited to the use of such a motor. The speed-change transmission mechanism is particularly efficient and economical because it may be constructed using only simple spur gears, and, with the exception of a single shiftable gear, all of the gears and pinions may be mounted to rotate on fixed shafts. The basic design principles upon which the invention is based are such that the number of functions to be controlled and the speeds of rotation of the cam mechanism may be varied over wide ranges with a high degree of universality of the component parts employed in different specific designs required to meet different specific needs.

The foregoing objects, features, and advantages, among others, will be more readily understood and appreciated from the following detailed description of illustrative embodiments of the invention and the principles upon which it is based.

Figure 1:
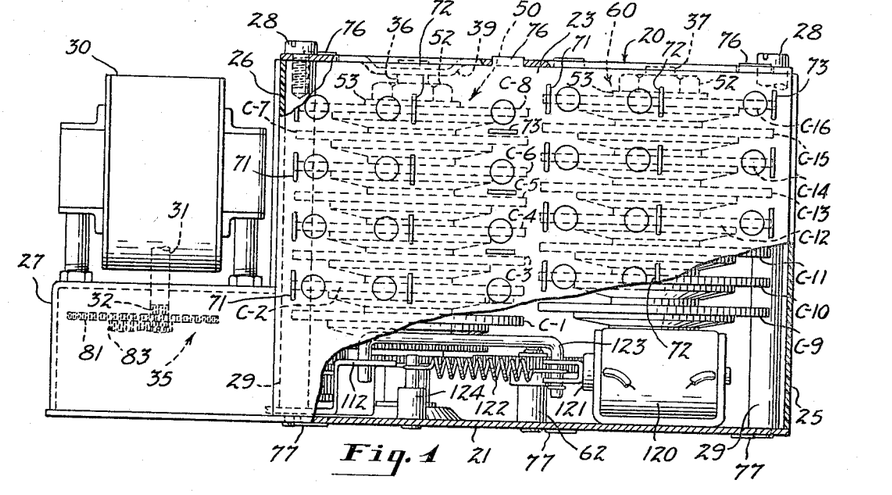
FIG. 1 is a front elevation of the timer with portions of the casing broken away to show a detail of the casing and a portion of the internal mechanism.
Figures 2, 3:
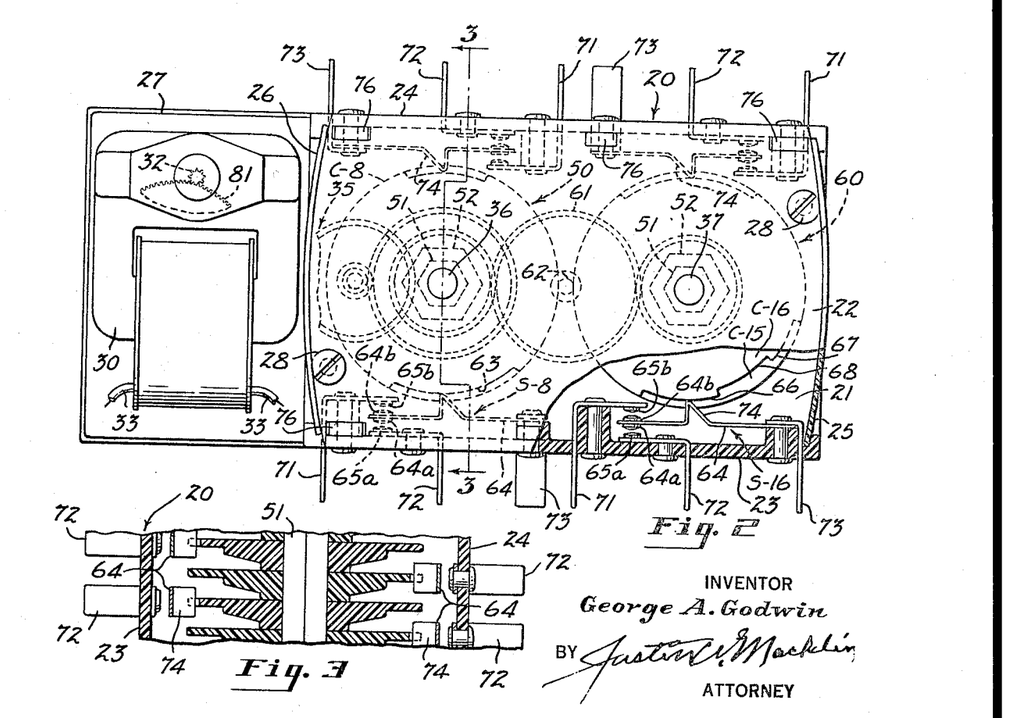
FIG. 2 is a top plan view of the assembled timer mechanism in its casing with the drive motor mounted on the laterally extended rigid part of the housing, a portion of the casing being broken away to show a cam and spring switch actuated thereby.
FIG. 3 is a fragmentary sectional view of the timer of FIGS. 1 and 2, taken on offset planes indicated by the line 3—3 of FIG. 2, the central portion of the view being through the axis of the cam shaft and cams.

Referring first to the general features of the program timer illustrated in FIGS. 1–3, the operating mechanisms may be mounted in part within and in part upon the outside of a housing assembly 20. Suitably, this housing assembly may include a metal base plate 21 over which is secured a casing assembly which is desirably made partly of metal and partly of a molded plastic having good dielectric properties. As shown, the casing assembly comprises a metal top or cover plate 22, relatively thick, plastic, front and back side walls 23 and 24, and slightly bowed plastic end walls 25 and 26 clamped between the side walls to define a main compartment. The end wall 26 may close only the upper portion of that end of the main compartment, leaving the lower portion opening into a smaller, auxiliary, housing compartment defined by a metal shell 27.

The parts of the housing assembly that define the main housing compartment may be held in place on the base plate 21 by means of studs 28 projecting downwardly through the top plate 22 and being threaded into internal rods 29 having lower ends permanently and rigidly secured in any desired manner to the base plate 21. The shell 27 defining the auxiliary housing may be secured in place similarly or in any other desired manner (not shown).

A single speed, electric motor 30 is suitably mounted on top of the auxiliary housing shell 27 outside of the casing 20 for better cooling. An output shaft 31 projects downwardly into the auxiliary housing and terminates therein with an integrally formed or separately assembled toothed portion that serves as a main driving pinion 32 for a speed reducing transmission to be described. Electrical power leads 33 to the motor 30 are shown in FIG. 2.

The aforementioned transmission, generally designated 35 and only partly shown in FIGS. 1 and 2, is largely contained inside the auxiliary housing shell 27 but extends laterally into the main housing compartment where it is connected in driving relationship with one or more cam shafts also mounted therein. In this case, there are two cam shafts 36 and 37 having vertical axes and extending between lower bearing bosses 38 therefor (FIG. 5), which may be formed integrally in the base plate 21, and upper bearings in the top plate 22. An upper bearing boss 39 (FIG. 1) integrally formed in the top plate 22 serves as a bearing for the cam shaft 36, whereas a simple hole through the top plate serves as the upper bearing for the other cam shaft 37 in the particular structure shown.

Suitably, each cam shaft may be a metal shaft having a body portion of one diameter from adjacent its upper end down to a portion 41 (FIG. 5) of enlarged diameter at its lower end, the enlarged portion 41 being circumferentially grooved to receive snap rings 42 that secure the shaft in its lower bearing boss against axial movement. Against the upper end of the enlarged, lower cam shaft portion 41, a washer 43 may be positioned for supporting a cam assembly and other parts.

In the case of the cam shaft 36, a gear 46 driven by the transmission 35, a spacing washer 47, a pinion 48 for driving the other cam shaft 37, and the washer 43, are interposed between the enlarged portion 41 of the cam shaft 36 and a cam assembly 50 thereon (FIG. 2), these parts and the cam assembly being provided with hexagonal axial bores that receive a sleeve 51 having a cylindrical bore and a hexagonal outer cross-section configuration. The sleeve 51 prevents relative rotation of the several parts mounted thereon, and all may be secured in place on the cam shaft 36 by a nut 52 and washer 53 adjacent its upper end below its upper bearing.

In the case of the cam shaft 37, a spacing sleeve 56, a pinion 57, and the washer 43 are interposed between the enlarged portion 41 of the cam shaft 37 and a cam assembly 60 thereon (FIG. 2), these parts and the cam assembly also being provided with hexagonal axial bores that, as in the case of the cam shaft 36, receive another sleeve 51 having a cylindrical bore and a hexagonal outer cross-sectional configuration, all being secured in place by another nut 52 and washer 53. The pinion 57 on the cam shaft 37 is identical with the pinion 48 on the cam shaft 36 and is driven thereby through an intermediate gear 61 so that, in this embodiment of the invention, both of the cam shafts turn at the same speed and in the same direction.

For some control purposes, however, it may be desirable to have the cam shafts 36 and 37 rotate at different speeds bearing a fixed relationship. This merely requires appropriate changes in the relative sizes of the pinion 48 on the shaft 36, pinion 57 on the shaft 37, and intermediate gear 61 on the stub shaft 62.

As shown in FIGS. 1–3, each cam assembly 50 and 60 may comprise a plurality of separate, molded plastic, cam discs (eight each in this case) mounted one above another for simultaneous rotation by the respective cam shafts 36 and 37. Each cam may have its periphery suitably notched for moving a switch-actuating follower as required by the particular operating program to be carried out. Identifying the individual cams for convenience by the reference characters C–1 to C–16, inclusive, the uppermost cam C–8 on cam shaft 36 is notched at 63 to hold a switch-actuating follower 64 of a double throw switch S–8 in an open or no-contact position between two terminals 65a and 65b of the switch when the follower is riding in the notch. While the follower is riding along the outer periphery of the cam C–8, it is moved outwardly into engagement with the switch contact 65a so as to close a circuit. In this example, the contact 65b of the switch S–8 is not used. The uppermost cam C–16 on the cam shaft 37, however, is notched to one depth at both 66 and 67 and to a greater depth at 68. When a similar follower 64 of a double throw switch S–16 is riding at the level of the notched portion 66, it is in an open position between two terminals 65a and 65b of this switch. While this follower 64 is riding along the outer periphery of the cam C–16, it is moved outwardly into engagement with its switch contact 65a so as to close a circuit; when it is riding at the level of the notch portion 68, it is permitted by its resiliency to move into engagement with its contact 65b so as to close a different circuit. Thus, in this case, both contacts of the switch S–16 are used.

The cam surfaces of the cams C–8 and C–16 are respectively representative of the simplest and most complex required for any program of switch operation, i.e., only notches of one depth or two different depths are ever required.

Eight identical switches are mounted on the front side wall 23 of the housing 20 for coaction, respectively, with the cams C–2, C–4, C–6, and C–8 on cam shaft 36 and with the cams C–10, C–12, C–14, and C–16 on the cam shaft 37. In a like manner, eight identical switches are mounted on the back side wall 24 of the housing for coaction, respectively, with the cams C–1, C–3, C–5, and C–7 on the cam shaft 36 and with the cams C–9, C–11, C–13, and C–15 on the cam shaft 37.

Each of the switches is of a simple construction employing four standard parts mounted in the front and back side walls as determined by holes and bosses molded therein to receive the switch parts and/or rivets for mounting the same. Referring to the switch S–16 by way of example, these four parts may comprise two strips 71 and 72 of brass formed of angle configuration and respectively carrying the two contacts 65b and 65a, a similar strip 73 constituting a lead to the follower 64. The follower 64 may be a strip of a copper spring alloy that is bent to form a follower shoulder 74 and carries a pair of contacts 64a and 64b for respectively engaging the oppositely disposed contacts 65a and 65b on the strips 72 and 71.

The follower member for each of the sixteen switches is shaped to normally dispose its follower shoulder 74 inwardly beyond the depth of the deepest cam notches, such as 68, so that it will at all times be biased outwardly from its preformed condition by either the outer periphery of its cam or a shallowly notched portion thereof (such as at 66) or by the inner of the spaced switch contacts (such as 65b). Thus, each switch follower may be preformed so as to require no adjustment after assembly of the switch. All four preformed switch parts of each of the sixteen switches may be preassembled in operative condition on their front or back side casing wall as standard assemblies by means of rivets, as shown in FIG. 2, regardless of the cam designs employed for actuating the switches; and each switch, without any subsequent adjustment, will operate properly for any of the cam design variants required for any program of switch operation.

A particularly advantageous feature of the switch construction just described is its wiping action as the movable contact 64a engages the stationary contact 65a and, similarly, as the movable contact 64b engages the stationary contact 65b. The flexing of the arm 64 that continues to some degree after initial engagement of a movable contact with a stationary contact, either because of the initial bias of the arm toward the associated cam or because of its engagement and reverse bending by a high segment of the cam periphery, as the case may be, causes the movable contact first to engage its associated stationary contact and then to slide along the latter with a wiping action until the flexing of the arm 64 is completed. This wiping action aids materially in keeping the mating contact surfaces clean and thereby insuring reliable circuit closing over longer periods of service without maintenance.

Figure 17:
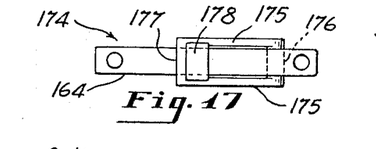
FIG. 17 is a plan view of a modified movable switch unit suitable for use in place of the switch elements shown in the timer of FIGS. 1–3.
Figure 18:
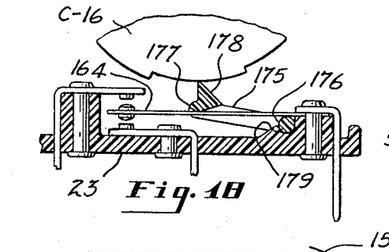
FIG. 18 is an elevational view of the movable switch unit of FIG. 17 mounted, in association with an actuating cam and a pair of stationary contacts and electrical leads, on a wall of the casing of the timer of FIGS. 1–3.

The modified form of switch illustrated in FIGS. 17 and 18 functions in a closely similar manner while being somewhat less expensive as a result of eliminating the manufacturing step of forming the follower shoulder 74 on the arm 64 and substituting an inexpensive plastic part 174 that performs the function of the shoulder in actuating the movable arm 164. The modified construction also eliminates any chance of breakage of the movable arms 64 due to the sharp bends formed in producing the shoulder 74 thereon.

Referring to FIGS. 17 and 18, the plastic part 174 comprises a pair of spaced parallel side parts 175 connected at one end by a cylindrical bearing bar 176 and at their opposite end by partially cylindrical bearing bar 177 having a shoulder 178 projecting therefrom to serve the function of the shoulder 74 on the switch arm 64. The bearing bar 176 is rotatably seated in a semi-cylindrical groove defined by a boss 179 molded on the inner surface of the timer casing side wall 23 (or 24). The movable switch arm 164 is biased to bear against the partially cylindrical bearing bar 177 and hold the shoulder 178 against a cam (such as the C–16). The cam actuates the movable switch arm 164 as the shoulder 178 follows the cam periphery, in the same manner that it actuates the movable switch arm 64 in the previously described switch design.

After a desired arrangement of cams for the cam assemblies 50 and 60 has been mounted as described above on the cam shafts 36 and 37, respectively, the standard front and back side walls (with eight switches mounted on each) are placed in position as shown with the end walls 25 and 26 positioned therebetween, and the cover plate 22 is secured in place by the studs 28 so as to hold the four side and end walls in place and the several switches in operative engagement with their respective cams. To facilitate the described assembly of all of these parts of the housing 20 and to insure accurate positioning of the switch cam followers against their respective cams with the proper pressure, special details of the housing construction are provided and will now be described with reference to their switch-positioning functions.

Referring again to FIGS. 1 and 2, both of the front and back side walls 23 and 24 of the housing 20 have three lugs 76 integrally formed thereon and projecting upwardly beyond the rest of the upper edge portions thereof. Similar lugs 77 project downwardly from the lower edges of these side walls (FIG. 1). The base plate 21 and cover plate 22 have similarly shaped and correspondingly located apertures through the front and back side margins thereof for receiving the lugs on the side walls and aligning the side walls with each other and fixing their spacing from each other. As shown best in FIG. 2, the central one of each group of three lugs 76 fits snugly in the corresponding cover plate aperture with no side or end clearance, whereas the outer two lugs 76 fit with no side clearance but some end clearance in the corresponding apertures of the cover plate. The lugs 77 fit similarly in the corresponding apertures of the base plate 21 (not shown). In this manner, the side walls 23 and 24 and the switches thereon are precisely positioned in alignment and with a predetermined spacing relative to each other and the several cams.

As previously mentioned, the end walls 24 and 25 of the housing are bowed at assembly. This insures that all parts of the housing will be accurately positioned and held immovably in a rattle-free condition.

Assembly of the housing is easily accomplished by positioning the side walls with the lugs 77 in their respective base plate apertures and with these walls in slightly upwardly diverging relationship. The cover plate is then positioned to receive the lugs 76 on one side plate. By squeezing the side walls into paralleslism and pressing downwardly on the cover plate, the lugs 76 on the other side wall can then be eased into their respective apertures, locking the entire assembly together. While still pressing downwardly on the cover plate, the studs 28 are screwed down to complete the assembly operation. The plastic end walls may then be slightly bowed and slid into place in the openings provided for that purpose.

Referring again to the sixteen switches, each fixed contact (such as 65a and 65b) and each pair of follower contacts (such as 64a and 64b) has a connecting conductor leg projecting outwardly through a side wall of the housing 20 for attachment of circuit wires (not shown in FIGS. 1–3) as required by the needs of the machine operating program to be controlled. These wires may be attached in any desired manner, as by connectors, binding post screws, or the like (not shown), and this may be done either before or after the described operation of assembling the housing 20.

Figures 4, 5, 6, 7:
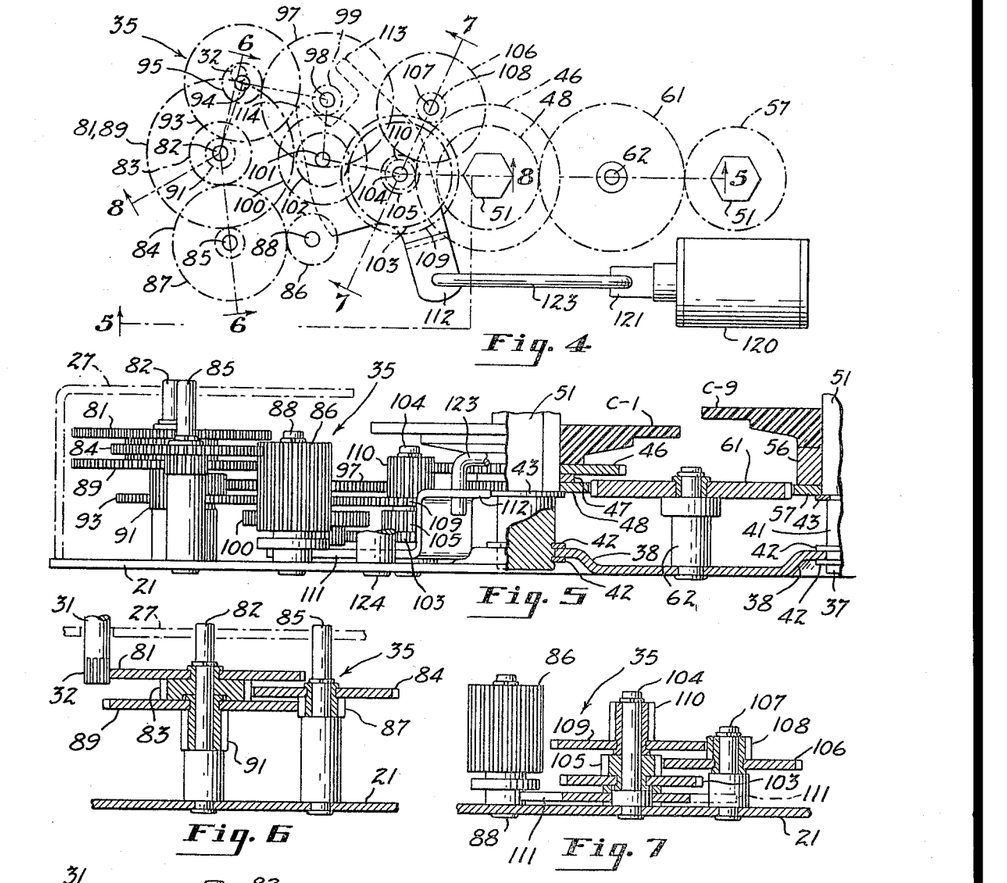
FIG. 4 is a diagrammatic plan view of one form of speed-change gear transmission suitable for driving the timer of FIGS. 1–3 and employing a solenoid gear shift actuator, the actuator being positioned to interconnect selected gear components for slow rotation of the timer disks.
FIG. 5 is a view, partly in elevation and partly in section, of the driving mechanism for the timer of FIGS. 1–3 employing the form of speed-change gear transmission of FIG. 4, the parts shown being those indicated in elevation and in section by the offset line 5—5 of FIG. 4.
FIG. 6 is a sectional detail of the driving mechanism of FIGS. 4 and 5, taken as indicated by the line 6—6 of FIG. 4.
FIG. 7 is another sectional detail of the driving mechanism of FIGS. 4 and 5, taken as indicated by the line 7—7 of FIG. 4.
Figure 8:
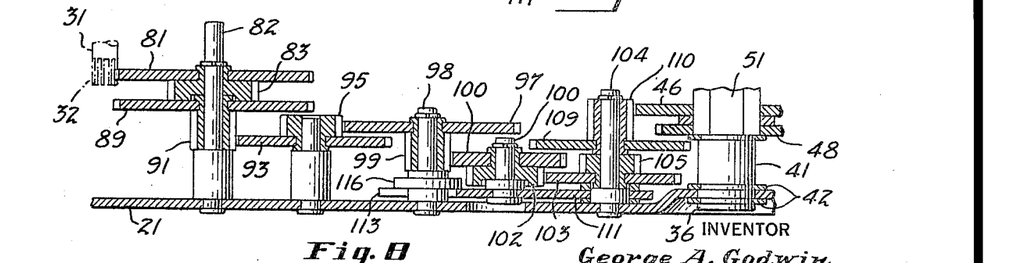
FIG. 8 is a fragmentary sectional view of the driving mechanism of FIGS. 4 and 5, taken in a number of angularly related planes as indicated by the line 8—8 of FIG. 4.
Figure 9:
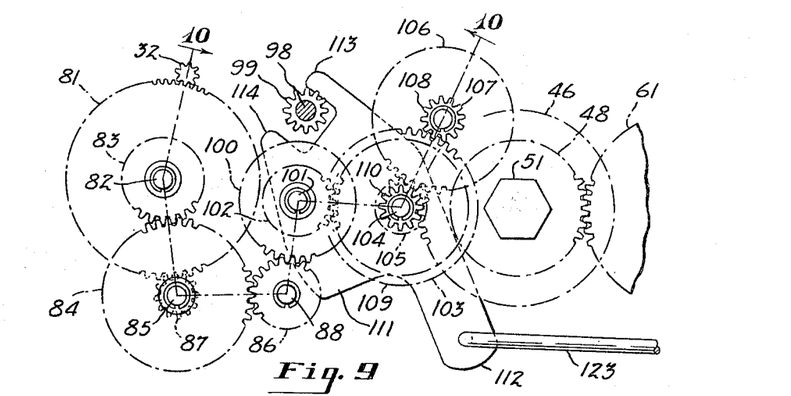
FIG. 9 is a diagrammatic plan view, on an enlarged scale, showing a portion of the driving mechanism of FIGS. 4 and 5 after being shifted to its position for rapid rotation of the timer disks, the unused gear components being largely omitted for simplicity.
Figure 10:
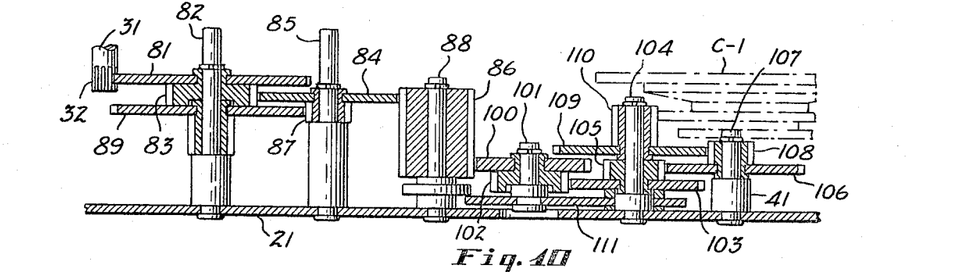
FIG. 10 is a developed sectional view through gear centers of the gear components of FIG. 9, the view being taken as indicated by the line 10—10 of FIG. 9.

Reference is now made to the details of the speed-reducing transmission 35, which has a speed-change gear arrangement and an electrically operated gear shift actuator, this transmission being shown in FIGS. 4–8 in condition for operation at the lower of two output speeds, and in FIGS. 9–10 in condition for operation at the higher speed. Referring principally at this time to the diagrammatic representations of the transmission in FIGS. 4 and 9, the driving pinion 32 on the output shaft 31 of the motor 30 is constantly in mesh with a gear 81 which constitutes the power input terminal gear of the transmission and rotates on a fixed shaft 82 mounted on the base plate 21 (FIGS. 6 and 10). This gear 81 drives a rigidly attached pinion 83 mounted therebelow for rotation on the shaft 82; the pinion 83 drives a gear 84 which rotates on a fixed shaft 85 mounted on the base plate 21; and a pinion 87 is rigidly attached to the gear 84 for rotation therewith on the shaft 85 (FIGS. 6 and 10).

The gear 84 serves as the input end gear of one of a pair of parallel gear trains having different speed reduction ratios, namely, the one having the higher output speed. The pinion 87 serves as the input end gear of the other gear train of that pair, namely, the one having the lower output speed.

First considering in detail the latter one of that pair of parallel gear trains (i.e., the one of low output speed), the pinion 87 on the shaft 85 drives a gear 89 mounted for rotation on the aforementioned fixed shaft 82, immediately below the gear 81 and pinion 83 thereon (cf., FIGS. 6 and 10). A pinion 91 is rigidly attached to and below the gear 89 for rotation therewith on the shaft 82 and drives a gear 93 that rotates on a fixed shaft 94 mounted on the base plate 21 (FIG. 8). A pinion 95 is rigidly attached to the gear 93 on its upper side for rotation therewith on the shaft 94 and drives a gear 97 that rotates on a fixed shaft 98 mounted on the base plate 21 (FIG. 8). A pinion 99 is rigidly attached to the gear 97 for rotation therewith on the shaft 98, and the pinion 99 drives a shiftable gear 100 mounted for rotation on a movable shaft 101 when the shiftable gear and its movable shaft are positioned as shown in FIG. 4, in which case the shiftable gear and its movable shaft are operative as parts of this one only of the two parallel gear trains of different speed reduction ratios (i.e., the one having the lower output speed).

The input end gear 84 of the gear train having the higher output speed drives a pinion 86 that rotates on a fixed shaft 88 mounted on the base plate 21 (FIGS. 5 and 7). This pinion 86 also serves as a driving gear for driving the shiftable gear 100 on its movable shaft 101 when they are moved for this purpose from their positions shown in FIG. 4 to their positions shown in FIG. 9 at the opposite end of their paths of travel. In their last mentioned positions, the shiftable gear 100 and its shaft 101 are operative parts of only that one of the two parallel gear trains that has the higher output speed.

A pinion 102 is rigidly attached to the shiftable gear 100 for rotation therewith on the movable shaft 101 and for translation with the shiftable gear and that shaft. The pinion 102 is constantly in mesh with and drives a gear 103 that rotates on a fixed shaft 104 mounted on the base plate 21 (FIGS. 7, 8, and 10). A pinion 105 is rigidly attached to the gear 103 at the upper side thereof for rotation therewith on the shaft 104 and drives a gear 106 that rotates on a fixed shaft 107 mounted on the base plate 21 (FIGS. 7 and 10). A pinion 108 is rigidly attached to the gear 106 on the upper side thereof for rotation therewith on the shaft 107 and drives a gear 109 that rotates on the aforementioned fixed shaft 104 above the pinion 105 and its attached gear 103 (FIGS. 7, 8, and 10). A pinion 110 is rigidly attached to the gear 109 for rotation therewith on the shaft 104. The last mentioned pinion 110 drives the gear 46 on the cam shaft 36 (FIGS. 8 and 10) which, through the gears 48, 61, and 57, in turn drives the cam shaft 37 as previously described.

By way of summary, and referring only to the gear components of the transmission for the sake of simplicity, the input end of the transmission includes a first series of gears that are always operative and that comprise the gear 81 (driven by the motor shaft pinion 32), its attached pinion 83, and a gear 84. The last mentioned gear 84 constitutes the input end gear of the high speed one of the two, selectively operable, parallel gear trains, and also serves as a driving member for the attached pinion 87, which constitutes the input end gear of the low speed one of the two, selectively operable, parallel gear trains.

The high speed one of the two parallel gear trains, which operates in response to shifting of the shiftable gear 100 from the position shown in FIG. 4 to the position shown in FIG. 9 includes only the gear 84 at one end, the intermediate gear 86 driven thereby, and the shiftable gear 100 when the latter is shifted into engagement therewith (FIG. 9). The low speed one of the two parallel gear trains includes the input end pinion 87 driving the gear 89, the attached pinion 91 driving the gear 93, the attached pinion 95 driving the gear 97, and the attached pinion 99 driving the shiftable gear 100 when the latter is shifted into engagement therewith (FIG. 4). Thus, the shiftable pinion 100 may be considered to be a part of both of the two parallel gear trains.

Power is transmitted with further speed reduction from the shiftable gear 100 to the attached pinion 102 driving the gear 103, the attached pinion 105 driving the gear 106, the attached pinion 108 driving the gear 109, and the attached pinion 110 driving the gear 46 on the cam shaft 36. Any one of the gears 103, 106, 109, and 46 may be viewed as an output terminal gear of the transmission as far as its speed-change gear shifting operations are concerned, i.e., only one such driven gear is necessary as a pivot gear for the shiftable gear 100, and as many additional gears as desired or none at all may be used according to the additional speed reduction required, if any.

Shifting of the shiftable gear 100, its shaft 101, and the pinion 102 along their arcuate paths of travel is accomplished by a shift plate 111 on which the lower end of the shaft 101 is rigidly mounted (FIG. 8). The shift plate 111 is pivotally mounted on the shaft 104, which is in turn rigidly mounted on the base plate 21 (FIGS. 7 and 8). The shift plate 111 includes a portion extended generally radially in one direction from its pivot shaft 104 to form an actuating arm 112 and a portion extending generally radially in another direction to form a pair of spaced stop arms 113 and 114 that straddle the shaft 98 below the pinion 99 thereon and between the base plate 21 and a flanged portion 116 on the shaft 98. These stop arms 113 and 114 alternately engage opposite sides of the shaft 98 to limit shifting movement of the shiftable gear 100 and properly position it in driven relationship with either of the gears 86 and 99 by which it is alternately driven (cf., FIGS. 4 and 9).

Shifting movement of the shift plate 111, in this embodiment of the invention, is effected by a solenoid 120 which, when appropriately energized and deenergized, reciprocates a plunger 121. Energizing the solenoid moves the plunger by electro-magnetic action in one direction against the force of a restraining spring 122. Deenergizing the solenoid permits the plunger to be moved in the opposite direction by the spring 122 (FIG. 1). A connecting link 123 is pivotally connected to the actuating arm 112 of the plate 111 and to the plunger 121 of the solenoid 120. A stub shaft 124 is rigidly mounted on the base plate 21 to anchor one end of the spring 122. As hereinafter described, the solenoid 120 is energized for effecting a gear shifting operation by an electric current supplied thereto from a source of electric power by the closing of any one of a number of intervening switches arranged in parallel and mounted in the housing 20, as described above, and actuated by associated cams on one of the cam shafts.

The embodiment of the invention shown in FIGS. 1–10, employing a solenoid-actuated shift mechanism, permits the motor 30 to turn in the same direction at all times. Thus, the motor 30 need not be reversible, and the solenoid 120 effects the speed-change shifting of the transmission 35 while the motor 30 is running.

Figure 11:
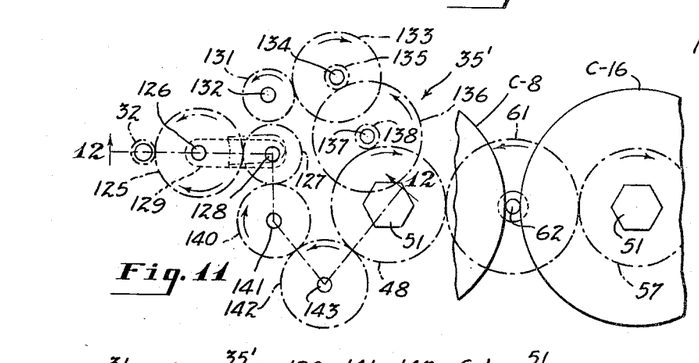
FIG. 11 is a diagrammatic view of a modified form of driving mechanism suitable for use in the timer of FIGS. 1–3 and employing a reversing motor for effecting speed-change gear shifting.
Figure 12:
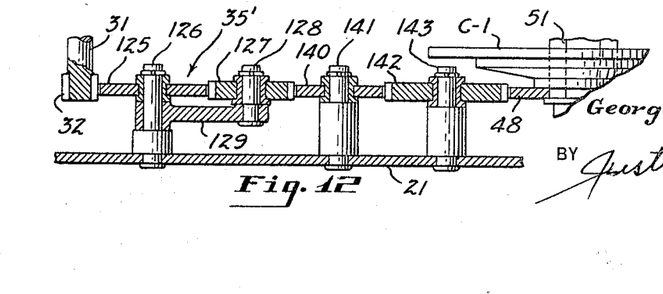
FIG. 12 is a developed sectional view through the gear centers of the gear components of FIG. 11, the view being taken as indicated by the line 12—12 of FIG. 11.
Figure 13:
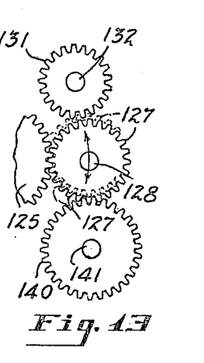
FIG. 13 is an enlarged detail of the two driving gears and shiftable driven gear of the gear train of FIGS. 11 and 12 showing the position of the shiftable gear in mesh with one of the driving gears and capable of shifting between meshing condition with either of two driven gears.

FIGS. 11–13 illustrate an alternative embodiment of the invention that eliminates the solenoid-actuated shift mechanism by employing an alternative form of speed-change gear transmission 35′ and a reversible electric motor 30′ (FIG. 16) in place of the unidirectional motor 30 and transmission 35. In this alternative embodiment of the invention, speed-change gear shifting in the transmission is responsive to the direction of rotation of the input terminal gear of the transmission, and is effected by reversing the motor to reverse the direction of rotation of the gear 32 on the motor shaft that drives the input terminal gear of the transmission. This, of course, also requires some electrical circuit changes. However, in all other respects, the program timer of this embodiment of the invention may be identical with the one of FIGS. 1–10.

Referring principally to the diagrammatic representation in FIG. 11 of the alternative form of transmission, the driving pinion 32 of the motor is constantly in mesh with a gear 125, which constitutes the power input terminal gear of the transmission and rotates on a fixed shaft 126 mounted on the base plate 21. This gear 125 drives a shiftable gear 127 mounted on a movable shaft 128 which is constrained by a connecting link 129 (FIG. 12) to movement about the fixed shaft 126 while the shiftable gear 127 remains constantly in mesh with the gear 125. As shown in FIG. 11, the link 129 carries the shiftable gear shaft 128 at one end thereof and is pivotally mounted at its opposite end on the fixed shaft 126.

The shiftable gear 127 constitutes a common input and gear for a pair of parallel gear trains of different speed reduction ratios. It is shifted, together with its movable shaft 128, back and forth along an arcuate path between one position, shown in FIG. 11, in which it constitutes an operative part of the one of the two parallel gear trains having the higher output speed, and a second position (shown in dot-dash outline in FIG. 13) in which it constitutes an operating part of the other of the two parallel gear trains having the lower output speed. As shown, the spacing of the gears 131 and 140 is such as to require a minimum travel of the shiftable gear 127 therebetween. Preferably the teeth of the latter are separated from one pinion only when partially engaged with the teeth of the other.

Shifting the shiftable gear 127 back and forth between its two positions is responsive to changes in the direction of rotation of the input terminal gear 125 of the transmission. When it has been shifted in this manner, it remains held in its shifted position against one or the other of the two gears alternately driven thereby. That this is so will be apparent from consideration of the directions of the forces acting between the gear 125 and shiftable gear 127 at the points of engagement of their respective sets of meshing teeth. These forces urge the shiftable gear, its movable shaft 128, and the links 29 in the same direction about the fixed shaft 126.

First considering the one of the two parallel gear trains having the lower output speed, it comprises the shiftable gear 127 and a gear 131 driven thereby, the latter rotating on a fixed shaft 132 mounted on the base plate 21. The gear 131, in turn, drives a gear 133 that rotates on fixed shaft 134 mounted on the base plate 21. A pinion 135, rigidly attached to the gear 133 for rotation therewith on the shaft 134, drives a gear 136 that rotates on a fixed shaft 137 mounted on the base plate 21. A pinion 138, rigidly attached to the gear 136 for rotation therewith on the shaft 137, drives the gear 48 on the cam shaft 36 (the gear 46 in the assembly of FIGS. 1–10 being omitted). The gear 48, in turn through the gears 61 and 57, drives the cam shaft 37 as previously described.

Next considering the one of the two parallel gear trains having the higher output speed, it comprises the shiftable gear 127 driving a gear 140 that rotates on a fixed shaft 141 mounted on the base plate 21. The gear 140 drives another gear 142 that rotates on a fixed shaft 143 mounted on the base plate 21. The last mentioned gear 142, in turn, drives the gear 48 on the cam shaft 36 for rotating both of the cam shafts 36 and 37 as last described above. Thus, in this case, the gear 48 on the cam shaft 36 is the output terminal gear of the transmission, i.e., it is an essential gear as regards the basic mode of operation of the transmission. As far as the character of the two parallel gear train arrangements of the transmission 35' is concerned, it is essentially the reverse, in principle, of the character of the parallel gear train arrangements in the transmission 35 of FIGS. 4–8. In the transmission 35, the input end gears of the two parallel gear trains are fixed and the common output end gear is shiftable. In the transmission 35', the common input end gear is shiftable and the output end gears are fixed.

As will be apparent from the foregoing description of the alternative transmission 35' of FIGS. 11–13, its greater simplicity and smaller number of parts is due primarily to the fact that the illustrated embodiment thereof is not designed to provide as much speed reduction as is the transmission 35 ilustrated in FIGS. 4–8. Obviously, by employing different numbers of gears in the two types of transmissions, the reverse comparison could be true. In other words, both are capable of being modified in a manner that will be well understood by those skilled in the art to cover any practical ranges of speed reduction ratios that may be required for controlling the program of operation of any particular machine.

Figure 14:
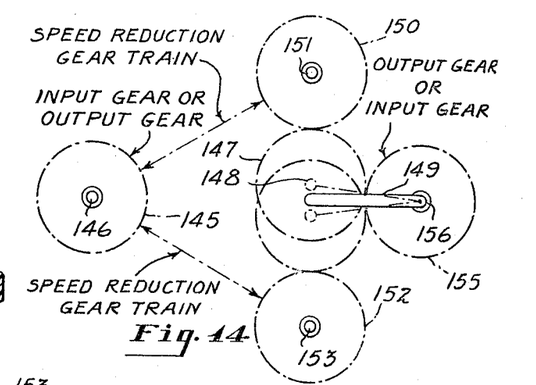
FIG. 14 is a schematic illustration of the gear assembly principles involved in the speed-change and speed-reduction components used in accordance with the invention.

The basic similarity between two types of transmissions 35 and 35' is illustrated diagrammatically in FIG. 14. In that figure, all of the essential features of the transmissions of both types are illustrated. As shown (ignoring gear sizes and speeds of rotation), a gear 145, rotating on a fixed shaft 146, may constitute either the output terminal gear or the input terminal gear of the transmission; and a gear 155, rotating on a fixed shaft 156, may constitute either the input terminal gear or the output terminal gear of the transmission. A shiftable gear 147, mounted on a movable shaft 148 by means of a link or shift plate 149, will remain constantly in mesh with the gear 155 as the gear 147 moves back and forth along its path of travel; and the shiftable gear 147 may constitute either the input end gear or the output end gear common to a pair of parallel gear trains having different speed reduction values. One of these parallel gear trains may include a gear 150 mounted on a fixed shaft 151 for engagement in either driving or driven relationship with the shiftable gear 147 at one end of its path of travel. The last mentioned gear 150 may be connected in either driving or driven relationship with the terminal gear 145 through any number of intermediate gears (not shown, but indicated by an arrow and legend in the drawing) mounted on fixed shafts and selected to produce any desired speed-change ratio between the speeds of rotation of the two terminal gears 145 and 155.

If the terminal gear 145 is to constitute the power input gear of this transmission, shifting of the shiftable gear 147 may be accomplished automatically as in the embodiment of FIGS. 1–8, or may be effected manually, without changing the direction of rotation of the gear 145. If the terminal gear 155 is to constitute the power input gear of the transmission, the shifting of the shiftable gear 147 may again be performed either automatically as in the embodiment of FIGS. 1–8, or manually, without changing the direction of rotation of the gear 155; alternatively, the shifting in the latter case may be effected automatically as in the embodiment of FIGS. 11–13 in response to changes in the direction of rotation of the input terminal gear 155. The number of gears employed in each of the two parallel, speed reducing gear trains may be altered, as will be well understood by those skilled in the art, to insure that the output terminal gear of the transmission will always rotate in the same direction under any of the alternative arrangements mentioned above.

To the extent that further speed reduction for both the high and low speeds is desired, either or both of the terminal gears 145 and 155 may be connected in driving or driven relationship with one or a series of additional gears selected for the purpose.

Figure 15:
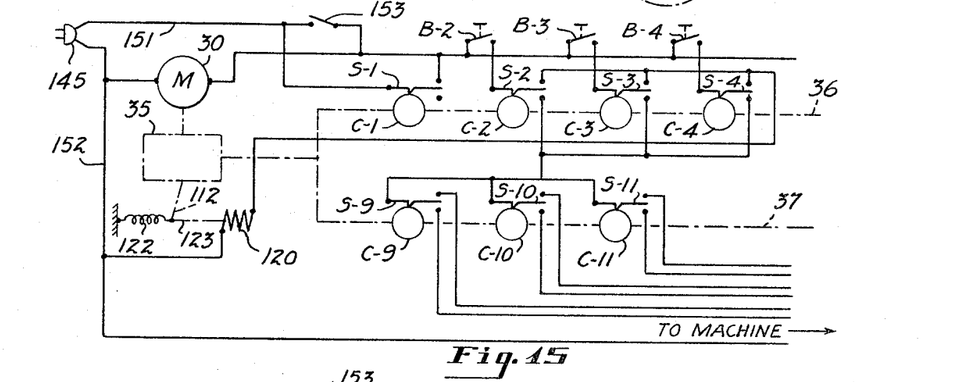
FIG. 15 is a partial wiring diagram showing an exemplary, simple arrangement of connections for the timer of FIGS. 1–3, employing the driving mechanism of FIGS. 4–10 as it may be used to control the operation of a machine.
Figure 16:
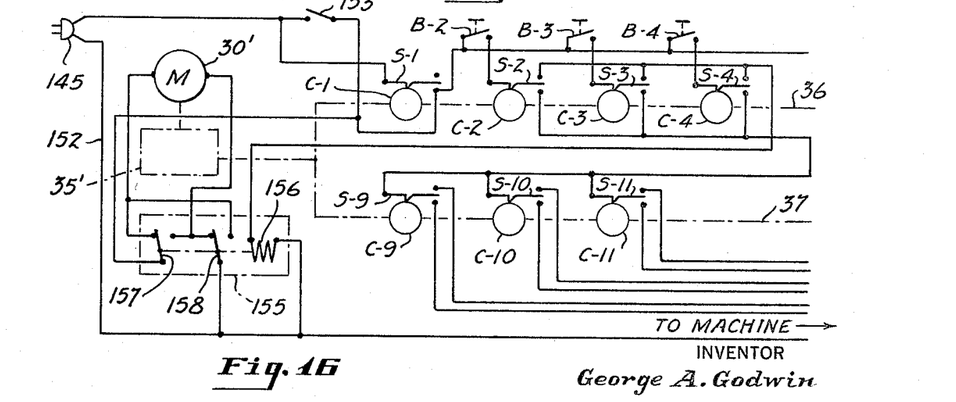
FIG. 16 is a similar wiring diagram showing an exemplary, simple arrangement of connections for the timer of FIGS. 1–3, employing the driving mechanism and reversing motor of FIGS. 11–13 to control the operation of a machine.

FIGS. 15 and 16 show two illustrative wiring diagrams for the embodiments of the invention that are respectively shown in FIGS. 1–10 and in FIGS. 11–13. Both wiring diagrams have been selected to represent the simplest applications of the program timers of the invention for controlling the program of operation of a machine, and both include only enough detail to disclose exemplary wiring of one group of cam controlled switches for effecting speed-change gear shifting of the transmission that drives the cams while another group of cam controlled switches is wired in a conventional manner to activate different operations of the machine to be controlled (not shown).

Referring first to FIG. 15, the first four cams C–1, C–2, C–3, and C–4 on the cam shaft 36 are shown as one bank of cams, and the first three cams C–9, C–10, and C–11 on the cam shaft 37 are shown as a separate bank of cams. The previously mentioned additional cams of each bank have been omitted for simplicity, their respective functions being sufficiently illustrated by the functions of the cams shown in each bank in FIG. 15.

As indicated diagrammatically by dot-dash lines, the cams in both banks are driven in parallel at the same speed by the program timer motor 30, which is preferably a shaded pole motor. The solenoid 120 for actuating the gear shifting mechanism of the transmission 35 (of FIGS. 4–10) is diagrammatically shown connected to the transmission shift arm 112 by the link 123, with the shifting mechanism held in its slow output speed position by the spring 122. Energizing of the solenoid 120 will actuate the link 123 and the connected shift arm 112 of the transmission shift plate to shift the transmission to its fast output speed condition, as previously described. Selection of the desired program is first made by actuating one only of the switches B–2, B–3, or B–4. The switch mechanism is such that actuation of any one automatically releases all others in accordance with conventional practice.

An electrical plug 145 for receiving electrical power from any conventional outlet box (not shown) is provided with main electrical leads 151 and 152 for supplying electrical power to the program timer and to the main machine when a starting switch 153 is closed to initiate operation as hereinafter described. Power is thus supplied directly to the program timer motor 30, to the main machine and its controls indirectly through double pole switches S–9, S–10, and S–11 (respectively actuated by cams C–9, C–10, and C–11), and indirectly to the solenoid 120 through switches S–2, S–3, and S–4 (respectively actuatable by the cams C–2, C–3, and C–4).

Placing the program timer in operation by closing the starting switch 153 energizes the program timer motor 30 and starts all of the cams rotating. At appropriate times determined by their respective cam surfaces, the cams C–9, C–10, and C–11 will sequentially operate to close and then open the associated switches S–9, S–10, and S–11 for successively completing and then breaking six main circuits to the machine to be controlled. The period during which each of the six main machine circuits remains operative will be the maximum period determined by the cam surface designs of the associated cams and by the slow output speed of the transmission 35, unless the solenoid 120 is energized to shift the transmission to its high output speed condition for shortening or omitting one or more of those periods.

Operation is initiated, as mentioned above, by closing one of the program switches B–2, B–3, and B–4 and then closing the starting switch 153. This completes circuits between the main leads 151 and 152 through the program timer motor 30 and starts the program timer by rotating all of the cams at their normal, slow rate of rotation if switches S–2, S–3, and S–4 are open, and at their high speed of rotation if switches B–2 and S–2, B–3 and S–3, or B–4 and S–4 are closed to energize the solenoid. The first cam C-1 has a cam surface of uniform radius except for a low spot of very short circumferential extent located thereon for stopping operation after a complete cycle of the machine. As soon as the cams have begun to rotate, after closing of the starting switches, the follower engaging the cam C-1 passes beyond the low spot thereon and rises to maintain the circuit supplying power from the lead 151 to the timer motor 30 in a closed condition until the complete cycle is finished. Only momentary closing of the switch 152 is required, since the cam C-1 quickly takes over the function of maintaining the circuit closed.

The push button switches B-2, B-3, and B-4 are respectively connected in series sets with the cam controlled switches S-2, S-3, and S-4 to provide three such sets, these sets being interposed in parallel between the main electrical lead 151 and one terminal of the solenoid 120. The other main electrical lead 152 is connected to the opposite terminal of the solenoid.

As rotation of the cams C-2, C-3, and C-4 sequentially closes the switches S-2, S-3, and S-4, as determined by the cam surfaces of these cams, the transmission 35 will either be shifted for a predetermined part of a cycle of the cams to its fast output speed condition by the solenoid 120 or will continue to operate in its slow output speed condition as determined by the pre-selected conditions of the push button switches B-2, B-3, and B-4. Thus, the duration of each machine operation initiated and stopped by closing and opening of one of the double pole switches S-9, S-10, and S-11 may be either a long or a short period, or omitted entirely, as determined by the pre-selected settings of the push button switches B-2, B-3, and B-4.

Referring next to FIG. 16, the program timer motor 30' is also shown as a shaded pole motor having two power leads 151 and 152. The motor 30' is connected to the transmission 35' of FIGS. 11-13 in which gear shifting is effected simply by reversal of the direction of rotation of the motor. The wiring circuitry for the cam actuated switches S-2, S-3, and S-4 for changing the output speed of the transmission 35' according to the settings of the push button switches B-2, B-3, and B-4 reverses the direction of rotation of the motor for this purpose, as hereinafter described, rather than effecting a mechanical gear shift, as in FIG. 15. Starting operation of the system requires momentary closing of the starting switch 153 as before, except that, in this case, current is supplied from the starting switch to the motor through a pair of double pole switches of a relay 155. In all other significant respects, the wiring diagram of FIG. 16 is identical with that of FIG. 15.

Referring to the relay 155, it is actuated by a solenoid 156 to throw a pair of double pole switches 157 and 158. As will be apparent from the drawing, throwing of these relay switches in one direction or the other reverses the two connections of the high potential leads 151 and 152 to the motor 30', thereby causing it to reverse its direction of rotation.

The operation effected by the circuit of FIG. 16 is generally the same as that of FIG. 15, except as noted. As rotation of the cams C-2, C-3, and C-4 sequentially closes the switches S-2, S-3, and S-4, as determined by the cam surfaces of these cams, the motor 30' will either be reversed for a predetermined part of a cycle of the cams or will continue rotating in the same direction, as determined by the pre-selected conditions of the push button switches B-2, B-3, and B-4. As previously explained, reversal of the direction of rotation of the motor 30' effects a speed change shifting of gears in the transmission 35. Assuming that closing of any one of the switches S-2, S-3, and S-4 and the resulting change in direction of rotation of the motor 30' shifts the transmission from its slow to its fast output speed condition, the duration of the corresponding machine operation initiated and stopped by closing and opening of the corresponding cam controlled switch S-9, S-10, or S-11 may be either a long or a short period, or omitted entirely, as determined by the pre-selected setting of the push button switches B-2, B-3, and B-4.

In order to illustrate the range of applications of the two embodiments of the invention described above, let us assume that the driving motor is a shaded pole motor having a speed of rotation of 3150 r.p.m. Using the transmission of FIGS. 4-10, gear ratios may be selected so that, in the high output speed condition, the shiftable pinion 100 will rotate at about 220 r.p.m. and the cam shafts 36 and 37 will rotate at about 2 r.p.m.; and in the low speed condition, the shiftable pinion will rotate slightly under 1 r.p.m. and the cam shafts will rotate as slow as one revolution in about two hours. Obviously, any lesser degrees of speed reduction at low and high output speeds and any lower ratio of the high to low output speeds may be obtained by appropriate changes in gear details that are within the skill of any transmission design engineer. The specific output speeds given as illustrations should be slow enough for almost any need in the household appliance industry and for a large proportion of the industrial machine applications for program timers of the cam-controlled-switch type.

The general design of the housing and the arrangement of cam shafts, cams, and cam-actuated switches are not only advantageous for the type of timers shown and described but are equally advantageous for timers in which the speed change is effected manually at desired times, as by manual actuation of the shift lever 112 in the transmission of FIGS. 4-9. It will be apparent that the shift lever may also be actuated mechanically by utilization of a suitable linkage driven by additional cams on either or both of the cam shafts, thus changing cam shaft rotation speed without the use of either a solenoid or a reversible motor. They are also advantageous for timers in which, for the entire operating cycle, either a standard single speed or a selected different constant speed of cam rotation is desired, with the speed being manually pre-selected in the latter case. The drive and cam shaft arrangement also permit easy adaptation to the separate driving of two or more cam shafts, independently and at different speeds, and permit manual preselection of starting positions of both cam shafts. Thus, in a combination clothes washer and dryer, one shaft can be employed to serve the washer portion of the cycle, automatically triggering the shift mechanism at the end of the cycle to start the rotation of the second cam shaft at a different speed and disengaging the first cam shaft. These features of the invention are also adaptable for employing a type of control knob commonly used in household appliances whereby initial closing of the starting switch or swithes is effected by manual rotation of the cam shafts. For this latter purpose, a simple clutch arrangement may be employed between the cam-driving pinion 46 and the cam shaft 36 driven thereby so as to permit rotation of the cam shafts without driving the gear trains of the transmission. Engagement and disengagement of the clutch in such an arrangement may easily be effected by axial movement of the control knob while it remains in driving engagement with the cam shafts, as is well understood in the art.

Thus, the features of the invention involving the illustrated housing, cam shaft, and cam-actuated switch arrangement are useful both with and without cam speed control in a complete line of all of the basic types of timers commonly required by the household appliance industry.

From the foregoing description of the invention, it will be appreciated that a number of related timer features have been provided which individually and collectively contribute to accomplishing the several objects of the invention set forth in the introductory portion of this specification, with the advantages also set forth therein and in the course of the ensuing description. As will be apparent to those skilled in the art, the particular details shown and described for illustrative purpose may be varied widely, and numerous changes therein will occur to those skilled in the art. Accordingly, all such variations and changes within the scope of the appended claims are contemplated as falling within the spirit and scope of the invention.

What is claimed is:

1. A time switch mechanism comprising a drive motor, a speed-change reduction gear transmission driven by said motor, a cam shaft driven by said gear transmission, a plurality of cams mounted on said cam shaft for rotation therewith, at least a corresponding plurality of electrical switches respectively mounted adjacent said cams for actuation by rotation thereof for controlling the operation of a machine, said transmission comprising a power input terminal gear connected in driven relationship with said motor, a power output terminal gear connected in driving relationship with said cam shaft, a pair of speed reduction gear trains of different speed reduction values, corresponding end gears of both of said gear trains being constantly in driven relationship with one of said input and output gears, said gear trains including a common shiftable gear at the opposite ends thereof, and means mounting said shiftable gear for limited arcuate movement, about one of said terminal gears and in mesh therewith, between one position in which the shiftable gear is operative as an end gear of one only of said gear trains and a second position in which it is operative as an end gear of the other one only of said gear trains.

2. A time switch according to claim 1, including a solenoid actuating member connected to said shiftable gear, mounting means for moving said shiftable gear back and forth between said first and second position, and electrical circuit means connected between said solenoid and a source of electrical power through at least one of said electrical switches for energizing said solenoid and thereby moving said shiftable gear to change the output speed of said transmission according to the rotational progress of said cams.

3. A time switch according to claim 1 in which said shiftable gear mounting means comprises a link having said shiftable gear rotatably mounted on one end thereof and being pivotally mounted at its opposite end for rotation about the axis of said input terminal gear, whereby the shiftable gear is urged about the input terminal gear in the direction of rotation of the latter, said mechanism also including an electrical circuit for reversibly driving said motor in either direction, said circuit being connectable between the motor and a source of electrical power through at least one of said electrical switches for reversing the direction in which the motor is driven in response to actuation of the switch by its associated cam and for thereby shifting said shiftable gear from one of said positions to the other so as to change the output speed of said transmission according to the rotational progress of said cams.

4. A time switch mechanism comprising a drive motor, a speed-change reduction gear transmission driven by said motor, a cam shaft driven by said gear transmission, a plurality of cams mounted on said cam shaft for rotation therewith, at least a corresponding plurality of electrical switches respectively mounted adjacent said cams for actuation by rotation thereof for controlling the operation of a machine, said transmission comprising a power input gear connected in driven relationship with said motor, a pair of speed reduction gear trains of different speed reduction values both driven at one end by said power input gear and including a common, shiftable output gear at the opposite ends thereof, and a pivot gear connected in driving relationship with said cam shaft, means mounting said shiftable gear for limited arcuate movement, about said pivot gear and in mesh therewith, beneath one position in which the shiftable gear is operative as the output gear of one only of said gear trains and a second position in which it is operative as the output gear of the other one only of said gear trains.

5. A time switch mechanism according to claim 4 in which said shiftable gear mounting means comprises a link having said shiftable gear mounted adjacent one end thereof and being pivotally mounted at the opposite end thereof for rotation about the axis of said pivot gear.

6. A time switch mechanism according to claim 4 in which said shiftable gear mounting means comprises a link having said shiftable gear mounted adjacent one end thereof and being pivotally mounted at the opposite end thereof for rotation about the axis of said pivot gears, said mechanism also including a solenoid actuating member connected to said link for moving said shiftable gear back and forth between said first and second positions, and electrical circuit means connected between said solenoid and a source of electrical power through at least one of said switches for energizing said solenoid and thereby moving said shiftable gear to change the output speed of said transmission according to the rotational progress of said cams.

7. A time switch mechanism comprising a drive motor, a speed-change reduction gear transmission driven by said motor, a cam shaft driven by said gear transmission, a plurality of cams mounted on said cam shaft for rotation therewith, at least a corresponding plurality of electrical switches respectively mounted adjacent said cams for actuation by rotation thereof for controlling the operation of a machine, said transmission comprising a power input gear connected in driven relationship with said motor, a power output gear connected in driving relationship with said cam shaft, a pair of speed reduction gear trains of different speed reduction values, the output ends of both of said gear trains being constantly in mesh with said power output gear, said gear trains including a common shiftable gear at the input ends thereof, means mounting said shiftable gear for limited arcuate movement, about said power input gear and in mesh therewith, between one position in which the shiftable gear is operative as the input gear of one only of said gear trains and a second position in which it is operative as the input gear of the other one only of said gear trains.

8. A time switch mechanism according to claim 7 in which said shiftable gear mounting means comprises a link having said shiftable gear mounted adjacent one end thereof and being pivotally mounted at its opposite end for rotation about the axis of said power input gear driven by said motor, whereby reversal of rotation of the motor and power input gear driven thereby will shift said shiftable gear from one of said positions to the other and change the speed at which said cam shaft is driven.

9. A time switch mechanism according to claim 7 in which said shiftable gear mounting means comprises a link having said shiftable gear mounted adjacent one end thereof and being pivotally mounted at its opposite end for rotation about the axis of said power input gear driven by said motor, whereby reversal of rotation of the motor and power input gear driven thereby will shift said shiftable gear from one of said positions to the other and change the speed at which said cam shaft is driven, said mechanism also including an electrical circuit for reversibly driving said motor, said circuit connecting the motor to a source of electrical power through at least one of said switches for reversing the motor and thereby moving said shiftable gear to change the output speed of said transmission according to the rotational progress of said cams.

10. A time switch comprising a drive motor, a speed reduction gear transmission driven by said motor, a cam shaft driven by said gear transmission, a plurality of cams mounted on said cam shaft for rotation therewith, at least a corresponding plurality of electrical switches respectively mounted adjacent said cams for actuation by rotation thereof for controlling the operation of a machine, said gear transmission including a power input gear connected in driven relationship with said motor, a power output gear connected in driving relationship with said cam shaft, a pair of speed reduction gear trains of different speed reduction values, both of said gear trains having a driving end gear constantly in driving relationship with said output gear, a shiftable gear meshed in driven relationship with and mounted for limited movement, about said input gear while in mesh therewith, between one position in which it is meshed in driving relationship with a driven end gear of one of said gear trains and a second position in which it is meshed in driving relationship with a driven end gear of the other of said gear trains, and shifting means for moving said shiftable gear back and forth between said first and second positions for changing the speed at which said cam shaft is driven by said motor.

11. A time switch comprising a drive motor, a speed reduction gear transmission driven by said motor, a cam shaft driven by said gear transmission, a plurality of cams mounted on said cam shaft for rotation therewith, at least a corresponding plurality of electrical switches respectively mounted adjacent said cams for actuation by rotation thereof for controlling the operation of a machine, said gear transmission including a power input gear connected in driven relationship with said motor, a power output gear connected in driving relationship with said cam shaft, a pair of speed reduction gear trains of different speed reduction values, both of said gear trains having a driven end gear constantly in driven relationship with said input gear, a shiftable gear meshed in driving relationship with and mounted for limited movement, about said output gear while in mesh therewith, between one position in which it is meshed in driven relationship with a driving end gear of one of said gear trains and a second position in which it is meshed in driven relationship with a driving end gear of the other of said gear trains, and shifting means for moving said shiftable gear back and forth between said first and second positions for changing the speed at which said cam shaft is driven by said motor.

12. A program timer for controlling a sequence of machine operations, comprising a drive motor, a speed-change speed-reduction transmission driven by said motor, said speed-change actuation of said transmission being responsive to reversal of the direction of rotation of said motor, a cam shaft driven by said transmission, a plurality of cams mounted on said cam shaft for rotation therewith, at least a corresponding plurality of electrical control switches respectively mounted adjacent said cams for actuation by rotation thereof in a predetermined sequence said switches including machine control switches and at least one timer control switch, shifting means including a motor reversing circuit in the power supply to the motor for actuating said transmission to change the speed reduction ratio thereof, and an electrical circuit connected between a source of electrical power and said shifting means for actuating the shifting means, said at least one timer control switch being interposed in said electrical circuit for activating the same, whereby the speed of rotation of said cam shaft and time sequence of actuation of said machine control switches are automatically controlled by the rotational progress of said cams.

13. A program timer of the cam-controlled-switch type comprising a base plate, a cam shaft mounted with its axis normal to said base plate and having one end journaled thereon for rotation, means carried by said base plate for driving said cam shaft in rotation, a plurality of disc cams coaxially mounted on and distributed along said sam shaft and providing axially spaced cylindrical cam surfaces, a housing shell for said cam assembly and a corresponding plurality of switches mounted on said shell and having spring followers for coacting respectively with said cam surfaces for actuation of the switches upon rotation of the cams, said spring followers being biased to bear against their cam surfaces with yielding spring forces so as to follow the surface contours thereof with a reciprocating action, said shell including at least one unitary panel having at least some of said switches mounted thereon, said shell further including at least one separate shell portion, removable means for securing said separate shell portion in fixed spaced relationship with said base plate, means along at least two edges of said unitary panel for locating said two edges thereof in fixed, predetermined positions against said base plate and separate shell portion, respectively, and holding said unitary panel in position in opposition to the spring forces acting between said followers and cam surfaces, and at least one additional, separate, unitary panel elastically deformed in the assembled shell and biased to said deformed condition by engagement with the unitary switch-mounting panel to hold such additional panel against movement relative to other parts of the shell.

14. A timing device comprising a housing formed of a pair of spaced rigid terminal boards of insulating material interconnected by rigid metal end plates, groove means provided along the edges of said terminal boards in the confronting surfaces thereof to provide two pairs of opposed grooves, and a pair of thin flexible side plates, each having opposed edges supported in a respective pair of said opposed grooves, said flexible side plates being clamped between said rigid terminal boards to provide an outward bow in said flexible side plates, cam shaft means rotatably supported within said housing, cam means carried by said cam shaft means; members defining switch means associated with said cam means; an electrical drive motor having a motor pinion; a driven gear mounted to drive said cam shaft means; and gear train means operatively interconnecting said pinion and said driven gear.

15. A housing for a timing device and the like and comprising a pair of spaced rigid terminal boards of insulating material interconnected by rigid metal end plates at least one of said end plates having at least one outwardly bow-shaped edge intermediate said terminal boards, groove means provided along the edges of said terminal boards in the confronting surfaces thereof to provide two pairs of opposed grooves, and a pair of thin flexible side plates, each having opposed edges supported in a respective pair of said opposed grooves, at least one of said flexible side plates being supported by compression between said rigid terminal boards with an edge thereof bowed over the outwardly bow-shaped edge of said one of said plates to provide an outward bow in said flexible side plates.

16. A timing device comprising a housing; cam shaft means rotatably supported within said housing; a plurality of spaced disc cams carried by said cam shaft means; a plurality of control members associated with said cams, each of said control members comprising a switch leaf fixed to said housing at one end and carrying at least one movable contact at its other end, fixed contact means carrying a fixed contact cooperatively associated with said movable contact, a cam follower attached to each of said switch leaves for pivotal and sliding movement relative thereto and comprising a rectangular frame having interconnected side bars and end bars, said leaf spring passing through said frame with one of said end bars positioned intermediate said leaf and the other of said end bars being positioned on the other side of said leaf near the fixed end thereof, pivot means interconnecting said other of said end bars and said housing for limiting the sliding movement of said follower, and a projection on one of said end bars forming a cam follower for engaging one of said cams; an electrical drive motor having a motor pinion; a driven gear mounted to drive said cam shaft means; and gear train means operatively interconnecting said pinion and said driven gear.

17. A control switch member for a timing device and the like and comprising support means, a plurality of control members each including a switch leaf fixed to said support means at one end and carrying at least one movable contact at its other end, fixed contact means cooperatively associated with said movable contact, a cam follower attached to said switch leaf for pivotal and sliding movement relative thereto and comprising a rectangular frame having interconnected side bars and end bars, said leaf spring passing through said frame with one of said end bars positioned intermediate said leaf and the other of said end bars being positioned on the other side of said leaf near the fixed end thereof, pivot means interconnecting said other of said end bars and said support means for limiting the sliding movement of said cam follower, and a projection on said one of said end bars forming a cam follower adapted to engage a cam.

References Cited by the Examiner

UNITED STATES PATENTS

| | | | |
|---|---|---|---|
| 2,870,834 | 1/1959 | Sisson | 200—38 X |
| 2,873,333 | 2/1959 | Jacaman | 200—168 |
| 2,976,375 | 3/1961 | Valdettaro | 200—168 X |
| 3,015,002 | 12/1961 | Laviana | 200—27 X |
| 3,040,227 | 6/1962 | Hauser | 200—38 |
| 3,048,758 | 8/1962 | Comerford et al. | 200—27 |
| 3,060,288 | 10/1962 | Gallagher et al. | 200—38 |
| 3,077,784 | 2/1962 | Laviana et al. | 200—38 |

BERNARD A. GILHEANY, *Primary Examiner.*

ROBERT K. SCHAEFER, *Examiner.*

H. M. FLECK, *Assistant Examiner.*